United States Patent [19]

Sanner et al.

[11] Patent Number: 5,053,677

[45] Date of Patent: Oct. 1, 1991

[54] PARKING LAMP OPERATING SYSTEM

[75] Inventors: John A. Sanner, Fort Wayne; W. Thomas Irick, New Haven, both of Ind.

[73] Assignee: Navistar International Transportation Corp., Chicago, Ill.

[21] Appl. No.: 518,366

[22] Filed: May 3, 1990

[51] Int. Cl.$^5$ .............................................. H60Q 1/26
[52] U.S. Cl. ...................................... 315/77; 315/83; 315/208; 307/10.7; 307/10.8
[58] Field of Search ........................... 315/77, 83, 208; 307/10.7, 10.8

[56] References Cited

U.S. PATENT DOCUMENTS

| | | | |
|---|---|---|---|
| 4,325,007 | 4/1982 | Prohaska et al. | 315/77 |
| 4,739,226 | 4/1988 | Murata | 307/10.8 |
| 4,841,198 | 6/1989 | Wilhelm | 315/82 |

*Primary Examiner*—Eugene R. LaRoche
*Assistant Examiner*—Tan Dinh

[57] ABSTRACT

A parking lamp operating system reduces the electrical load on the battery of a vehicle, such as a truck, during periods when the vehicle engine is off but the parking lamps of the vehicle remain on wherein a switched signal input from the battery is modulated to provide a pulse-width-modulated output to the gate of a power transistor having a power input from the battery and an output to the parking lamps. The pulsed signal causes the transistor to intermittently switch the power to the lamps thereby reducing the effective voltage thereto while providing sufficient light output to be observed. The modulator may be bypassed by a second signal line connected to the vehicle alternator to provide a continuous signal to the transistor gate, thereby providing full power to the lamps when the engine is running.

20 Claims, 2 Drawing Sheets

PARKING LAMP OPERATING SYSTEM

BACKGROUND OF THE INVENTION

The present invention relates to a parking lamp operating system which reduces the electrical load on the batteries of a vehicle, such as a heavy duty truck, during periods when the engine of the vehicle is turned off but the parking lamps of the vehicle must remain on and more particularly, to a system which modulates a signal from the battery to provide a waveform output to control a switching means, such as a power transistor, disposed between the battery and the parking lamps, and thereby provided a pulse-width-modulated output to the lamps, lowering the effective voltage thereto to conserve power, while providing sufficient light output to be observed.

DESCRIPTION OF THE PRIOR ART

During vehicle operation, such as heavy truck line hauling, a vehicle operator will oftentimes sleep in the vehicle and leave the parking lamps on so the vehicle can be readily observed. Typically, the engine of the vehicle is turned off during such periods and the electrical load on the vehicle power system created by the parking lamps being left on will tend to discharge the system power source, i.e., the vehicle battery, since the engine is not running.

In applications where no auxiliary battery system is provided for such a load, leaving the lamps on while the vehicle engine is off may lead to a condition wherein the vehicle engine cannot be restarted. Alternatively, when an auxiliary battery system is provided, the parking lamp load may deplete that battery resulting in insufficient power for operation of electric heating blankets, refrigerators, and the like.

SUMMARY OF THE INVENTION

Accordingly, it is a primary object of the invention described and claimed herein to significantly reduce the electrical load created on the vehicle batteries by the parking lamps of the vehicle when the engine is off and to thereby maintain the batteries of the vehicle in a usable condition for an extended period of time.

This object and other object as will become apparent hereinafter are specifically met in a vehicle parking lamp operating system wherein a manually switchable power conservation module is disposed between the vehicle battery and the parking lamps. The conservation module includes a pulse width modulator which, when the module is turned on and the normal parking light switch is off, drives a solid state switching circuit to intermittently turn on to provide a reduced duty cycle voltage from the battery to the parking lamps. The module is further provided with an input from the vehicle alternator, which is switched with the module power input, to override the modulator output to the switching circuit and thereby provide full voltage to the lamps when the engine is running and also light an indicator lamp to advise the operator that the power conservation module remains engaged. In a second embodiment of the invention, an auxiliary battery is used exclusively of the main batteries to power both the conservation module and the parking lights when the engine is not running.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENTS

Figure 1:
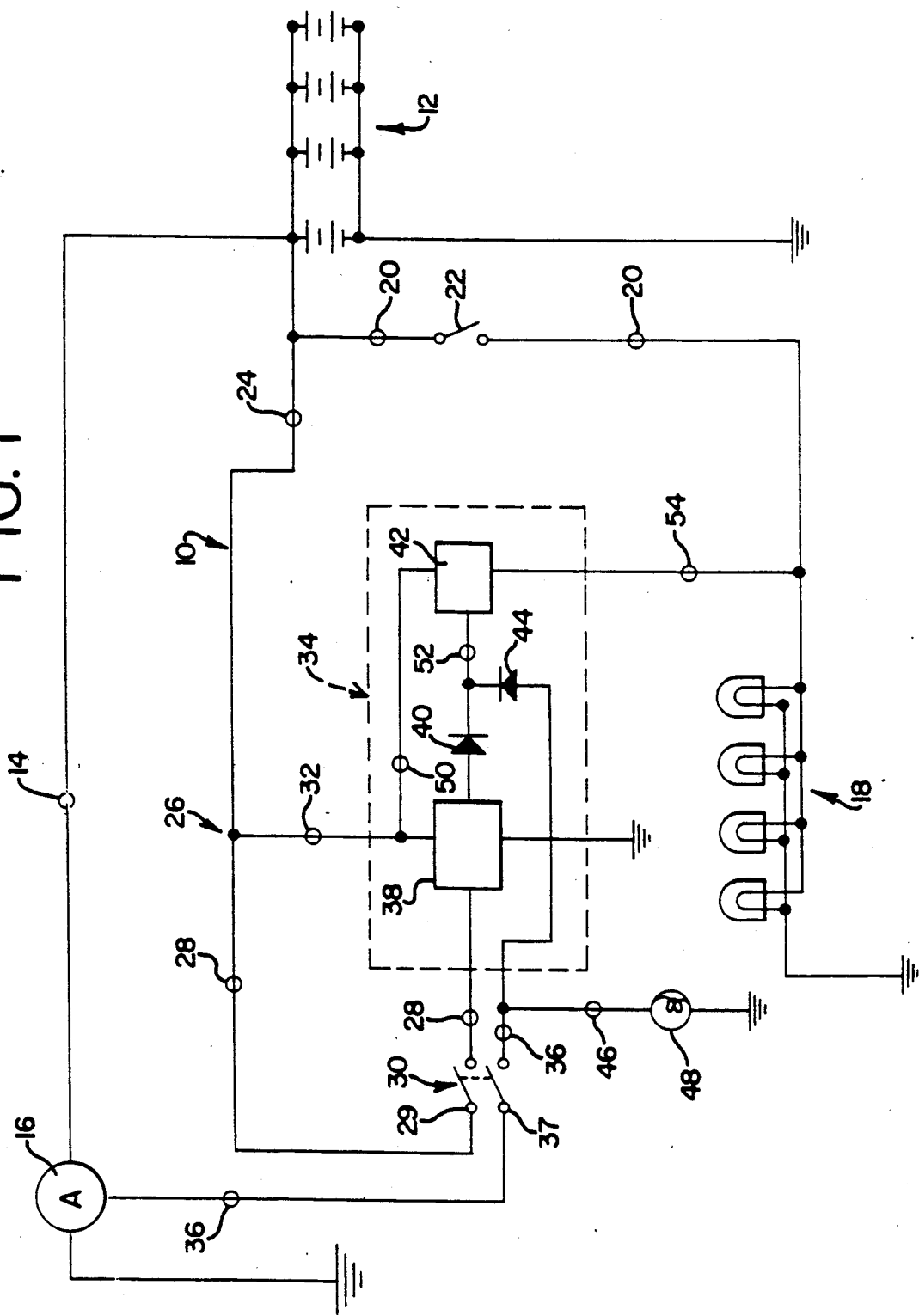
FIG. 1 is a schematic circuit diagram of the parking lamp operating system of the present invention as proposed for use in a vehicle power system where no auxiliary power source is provided.

Referring now to the drawings, there is illustrated in FIG. 1 the parking lamp operating system of the present invention generally identified by the reference numeral 10. As shown, a power system 12 of a heavy duty truck may comprise a number of 12 volt batteries 12 connected in parallel. A 12 volt output along line 14 from an alternator 16 of the truck charges the batteries or power system 12 when an engine (not shown) of the truck is running. The truck also includes parking lamps 18 which are powered by the power system 12 via line 20 when a switch 22, normally part of the vehicle master light switch, located within the operator compartment of the vehicle is manually engaged by the vehicle operator.

Power to the parking lamp operating system 10 is provided along a line 24, which bifurcates at 26, with one branch 28 leading to an input 29 of a double-pole, single-throw switch 30 of the system 10 and with another branch 32 feeding power to a conservation control module 34 of the system 10.

The alternator 16 further includes a 6 volt reference voltage output which is electrically engaged through line 36 to a second input 37 of the switch 30. With the switch 30 closed, both power supply lines 28 and 36 feed into the conservation control module 34 of the system 10.

Within the conservation control module 34, power line branch 28 feeds a modulator circuit 38 which changes the 12 volt DC signal from the vehicle power system 12 to a pulse width modulated signal having a 6 volt time-averaged or duty cycle voltage which is applied to diode 40 which feeds a switching circuit 42 with the pulsed 6 volt signal, intermittently turning circuit 42 on as directed by the modulator circuit 38 to supply the voltage from line 32 connected thereto at a reduced duty cycle voltage of 6 volts to the output 54 of the conservation module 34 and thus to the lamps 18.

It will be understood that switching circuit 42 may be realized by the provision of any one of a number of devices, such as, for example, by a power field effect transistor or by a Darlington transistor. In such realization, when using a transistor, the gate of the transistor would be controlled by the signal from modulator circuit 38 entering the transistor via line 52.

As described above, the pulse width modulator circuit 38 operates the switching circuit 42 by providing a waveform thereto which itself has a decreased power output. Thus, when engaged, the conservation control module 34 produces a lower effective load on the power system 12 of the vehicle than it would if a simple modulator were used.

Upon engine starting, the alternator 16 of the vehicle begins to supply power to the reference voltage output line 36, and through second input 37 of the switch 30. When the switch 30 is engaged, the 6 volt continuous signal on line 36 is applied to diode 44 and from there to the switching circuit 42, thus turning the circuit continuously on and thereby providing full 12 volt power from line 32 to the parking lamps 18. When the truck is operating on the highway with the parking lamps 18 on, federal and state regulations require that they be operating at full power. Thus, if the operator forgets to turn off the conservation control module 38 once the engine of the vehicle is started, the system 10 will automatically provide full power to the parking lamps 18 while warning the driver via warning lamp 48 to turn the conservation control module 34 off by disengaging switch 30 and engaging the conventional parking lamp switch 22.

It will be seen that line 46 coming off line 36 also feeds power to an indicator lamp 48 electrically engaged thereto. The indicator lamp 48 is mounted on the vehicle control panel (not shown) to indicate to the operator that the conservation control module 34 should be disengaged by manual operation of the switch 30, and that full power should be supplied in the usual manner, through power line 20 by activation of parking lamp switch 22 when the alternator 16 is operating.

It will further be understood that diode 44 is reverse biased so that power on line 50 exiting the modulator circuit 38 does not turn warning lamp 48 on via line 36 and that diode 40 is placed within power line 50 so that DC power flowing through line 36 from the alternator 16 is not allowed to flow into the modulator circuit 38.

In summary, when switch 30 is off, the conservation control module 34 receives no power input and the circuit 42 has no signal applied thereto and therefore there is no conduction therethrough, thus maintaining the parking lamps 18 in an "off" condition unless the normal parking lamp switch 22 is closed. When switch 30 is turned on by the operator, the conservation control module 34 delivers a pulsed output to periodically turn on the circuit 42, at rates higher than visible flashing to the human eye, to produce a duty cycle voltage sufficient to light the parking lamps 18 at an observable minimum brightness via output line 54 which electrically engages line 20 feeding the parking lamps 18.

Figure 2:
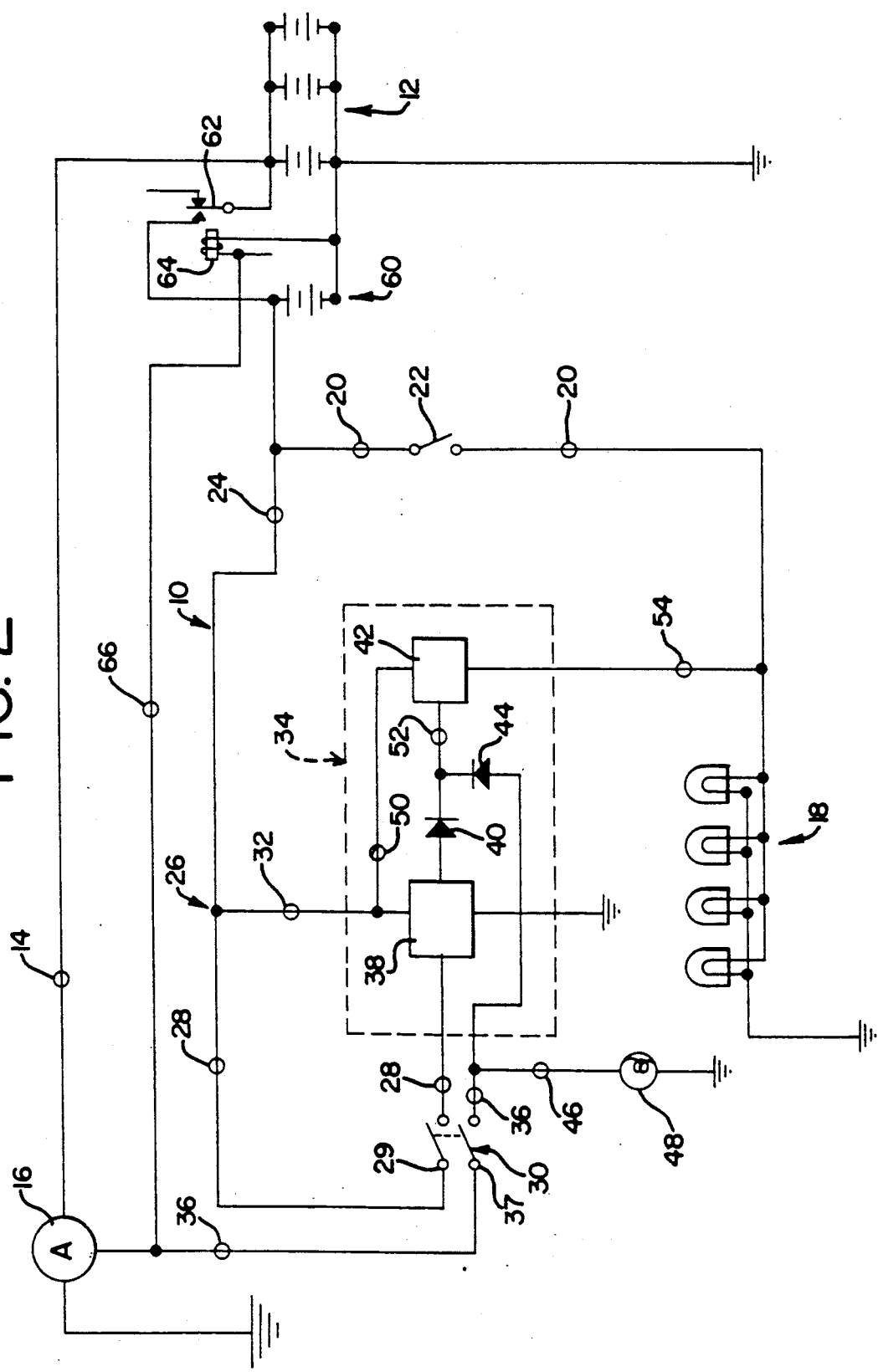
FIG. 2 is a schematic circuit diagram similar to that of FIG. 1 showing the parking lamp operating system as proposed for use in a vehicle power system where an auxiliary power supply is available.

Turning now to FIG. 2, the principals and operation of the parking lamp operating system 10 are the same. However, the system 10 illustrated in FIG. 2 is supplied with power from an auxiliary battery 60 of a conventional auxiliary battery system instead of from the main power system 12 of the vehicle.

It will first be noted that in the conventional auxiliary battery system illustrated, the auxiliary battery 60 is isolated from the main power system 12 by placement of a normally-open relay 62 therebetween. The relay 62 is operated by a 6 volt coil 64 which is energized by power supplied thereto via a line 66 feeding off the reference voltage output line 36 from the alternator 16. Thus, when the vehicle engine is running and the alternator 16 is producing a charge, the coil 64 is activated, thereby closing the contacts of relay 62 to create a closed circuit thereacross and electrically couple the auxiliary battery 60 in parallel with the main batteries 12 to provide charging of the auxiliary battery. Alternatively, when no power is being generated by the alternator 16, the relay 62 is maintained in the normally open position thereof.

Thus, when the parking lamp operating system of the invention is used in conjunction with an auxiliary battery system, the load produced by the parking lamp operating system 10 and the parking lights, when operated thereby, is applied only to the auxiliary battery 60, leaving a full charge on the main batteries 12 available for starting the vehicle.

As described above, the parking lamp operating system of the present invention has a number of advantages some of which have been described above and others of which are inherent in the invention. It will be apparent to those of ordinary skill in the art that modifications may be made to the system without departing from the teachings of the invention. For example, although the invention described herein incorporates a separate parking lamp switch 22 for normal vehicle operation, the parking lamp switch 22 could be eliminated entirely, if permitted by highway safety regulations, or the switch 30 could be incorporated into the vehicle master light switch in place of the normal parking light switch 22 therein. Accordingly, the invention should only be construed in accordance with the accompanying claims.

What is claimed is:

1. A parking lamp operating system for a vehicle having a main power line including a manually operated parking lamp switch to the parking lamps, for use in conserving power when the parking lamps are being operated only on a vehicle battery, said system comprising:
   selective means for connecting a steady state signal input from said vehicle battery to a conservation control module;
   said conservation control module including a modulator means for converting said steady state input signal received from said vehicle battery to a waveform signal and a switching means having a first signal input connected to said waveform signal, a second power input connected to said vehicle battery, and an output connected to said parking lamps by a secondary power line which joins said main power line to the lamps downstream of said manually operated parking lamp switch, said switching means being responsive to said waveform signal input to intermittently connect, at the frequency of said waveform signal, said power input to said output to said parking lamps.

2. The system of claim 1 and said selective means for connecting said conservation control module to the battery of the vehicle including a manually operable switch.

3. The system of claim 1 wherein said modulator means for producing said waveform signal comprises a pulse width modulator.

4. The system of claim 3 wherein said switching means comprises a power field effect transistor.

5. The system of claim 2 wherein said manually operable switch is a double-pole, single-throw switch.

6. The system of claim 5 wherein said vehicle battery feeds a first pole of said switch.

7. The system of claim 6 wherein a line carrying a reference voltage signal from an engine driven alternator of the vehicle feeds a second pole of said switch.

8. The system of claim 7 wherein said reference voltage power line feeds power directly to said switching means of said system.

9. The system of claim 8 wherein said line carrying said reference voltage signal feeds power to an indicator lamp connected thereto downstream of said switch.

10. The system of claim 9 wherein said power line from said battery to said switch powers said modulator and said switching means of said system.

11. The system of claim 1 wherein said vehicle battery is an auxiliary battery which is isolated from the vehicle power system during periods when an alternator of said vehicle is not operating.

12. The system of claim 11 wherein said auxiliary battery is isolated from said vehicle power system by a relay which connects said battery in parallel with main batteries of said power system upon said relay receiving a reference voltage from said vehicle alternator.

13. A parking lamp operating system for a vehicle having an engine, for use in reducing the power required when the parking lamps are being operated only on a vehicle battery, said system comprising:
- selective means for connecting a steady state signal input from said vehicle battery to a conservation control module;
- said conservation control module including a means for modulating said steady state input signal received from said vehicle battery to a waveform signal and a switching means having a first signal input connected to said waveform signal, a second power input connected to said vehicle battery, and an output connected to said parking lamps, said switching means being responsive to said waveform signal input to intermittently connect, at the frequency of said waveform signal, said power input to said output to said parking lamps;
- and means bypassing said modulating means for providing full power to said parking lamps when the vehicle engine is operating.

14. The system of claim 13 wherein said conservation control module is connected to an auxiliary battery of the power system.

15. The system of claim 13 wherein said means for modulating the waveform of the signal comprise a pulse width modulator.

16. A parking lamp operating system for a vehicle having an engine, for use in reducing the power required when the parking lamps are being operated only on a vehicle battery, said system comprising:
- selective means for connecting a steady state signal input from said vehicle battery to a conservation control module;
- said conservation control module including a means for modulating said steady state input signal received from said vehicle battery to a waveform signal and a switching means having a first signal input connected to said waveform signal, a second power input connected to said vehicle battery, and an output connected to said parking lamps, said switching means being responsive to said waveform signal input to intermittently connect, at the frequency of said waveform signal, said power input to said output to said parking lamps;
- and means for bypassing said modulating means to provide full power to said parking lamps when the vehicle engine is operating, said means for bypassing said modulating means including a second signal line directly feeding said switching means in said conservation control module, said secondary signal line being connected to the reference voltage terminal of an alternator of said vehicle.

17. The system of claim 16 wherein said selective connecting means establishes a simultaneous connection of said second signal line to said switching means.

18. The system of claim 16 including an indicator lamp powered from said secondary signal line for indicating engagement of said power control module when alternator power is being supplied to said parking lamps.

19. The system of claim 18 and a diode disposed in said secondary signal line downstream from said indicator lamp to prevent said waveform signal from lighting said indicator lamp.

20. The system of claim 15 and a diode disposed between said modulator and said switching means to prevent said secondary signal from being connected to said modulator.

* * * * *